United States Patent
Tsun

(10) Patent No.: US 8,112,672 B2
(45) Date of Patent: *Feb. 7, 2012

(54) DIAGNOSTICS AND ERROR REPORTING FOR COMMON TAGGING ISSUES

(75) Inventor: Stephen Tsun, Cupertino, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/637,196

(22) Filed: Dec. 14, 2009

(65) Prior Publication Data

US 2010/0095155 A1  Apr. 15, 2010

Related U.S. Application Data

(63) Continuation of application No. 11/554,397, filed on Oct. 30, 2006, now Pat. No. 7,644,315.

(51) Int. Cl.
*G06F 11/00* (2006.01)
(52) U.S. Cl. ........................ 714/38.1
(58) Field of Classification Search .......... 714/32, 714/38, 38.1; 715/760
See application file for complete search history.

(56) References Cited

U.S. PATENT DOCUMENTS

| | | | |
|---|---|---|---|
| 5,724,504 A * | 3/1998 | Aharon et al. | 714/33 |
| 6,353,923 B1 | 3/2002 | Bogle et al. | |
| 6,397,245 B1 * | 5/2002 | Johnson et al. | 709/203 |
| 6,397,259 B1 * | 5/2002 | Lincke et al. | 709/236 |
| 6,463,578 B1 | 10/2002 | Johnson | |
| 6,587,995 B1 * | 7/2003 | Duboc et al. | 716/106 |
| 6,615,091 B1 | 9/2003 | Birchenough et al. | |
| 6,668,369 B1 | 12/2003 | Krebs et al. | |
| 6,874,021 B1 | 3/2005 | Liu et al. | |
| 6,996,067 B1 * | 2/2006 | Burke et al. | 370/248 |
| 7,047,277 B1 * | 5/2006 | Welter et al. | 709/203 |
| 2001/0028359 A1 * | 10/2001 | Muraishi et al. | 345/700 |
| 2002/0026464 A1 * | 2/2002 | Jones et al. | 708/200 |
| 2002/0046016 A1 | 4/2002 | Debling et al. | |
| 2002/0078406 A1 * | 6/2002 | Kondoh et al. | 714/48 |

(Continued)

FOREIGN PATENT DOCUMENTS

EP  1 420 562  5/2004
JP  2004-185063  7/2004

OTHER PUBLICATIONS

Anonymous: "Script Debugger 4, Run & Debug" [Online] Jul. 8, 2006), pp. 1-3, XP002592275, Late Night Software Retrieved from the Internet: URL:http://web.archive.org/web/20060708114635/www.latenightsw.com/sd4/run_debug.html> [retrieved on Jul. 16, 2010], 1 page.

Aaron N: "dbug—a console.log (firebug) wrapper" [Online] Aug. 24, 2006, pp. 1-1, XP7913918 Clientcide, Retrieved from the Internet: URL:http://www.clientcide.com/best-practices/dbug-a-consolelog-firebug-wrapper/>[retrieved on Jul. 16, 2010], 3 pages.

(Continued)

*Primary Examiner* — Scott Baderman
*Assistant Examiner* — Yair Leibovich
(74) *Attorney, Agent, or Firm* — Fish & Richardson P.C.

(57) ABSTRACT

Content requests are debugged in accordance with a presence of a flag in a request to a publisher. A document received from the publisher contains a script to debug requests for content to a content provider. The requests are examined to determine the presence of informational, warning and error conditions. The conditions are written to a debugging user interface.

19 Claims, 5 Drawing Sheets

U.S. PATENT DOCUMENTS

| | | |
|---|---|---|
| 2002/0097268 A1 | 7/2002 | Dunn et al. |
| 2003/0098879 A1* | 5/2003 | Mathews .................. 345/762 |
| 2003/0233563 A1* | 12/2003 | Kruse ....................... 713/193 |
| 2004/0117769 A1 | 6/2004 | Lauzon et al. |
| 2004/0216042 A1 | 10/2004 | Consolatti et al. |
| 2005/0177401 A1 | 8/2005 | Koeppel et al. |
| 2005/0246589 A1* | 11/2005 | Tsai et al. ................... 714/38 |
| 2007/0150556 A1 | 6/2007 | Fukuda et al. |
| 2008/0052663 A1* | 2/2008 | Cope et al. .................. 717/101 |

OTHER PUBLICATIONS

Supplementary European Search Report for EP 07844735.6 dated Aug. 16, 2010, 4 pages.

Communication pursuant to Article 94(3) EPC for EP 07844735.6 dated May 27, 2011, 6 pages.

* cited by examiner

Google Debug Window

[Submit Data]

| Offset (msec) | Level | Message |
|---|---|---|
| 0 | Information | google_ads.js is being loaded at Monday, July 31, 2006 1:56:12 PM |
| 0 | Information | publisher URL=http://www.corp.google.com/~stsun/ads2/badfill.html?google_debug |
| 0 | Information | user agent=Mozilla/5.0 (Windows; U; Windows NT 5.1; en-US; rv:1.8.0.5) Gecko/20060719 Firefox/1.5.0.5 |
| 0 | Information | google_ads.js finished loading |
| 0 | Information | Slot: publisher id=ca-pub1, name=TOPSLOT has been added |
| 0 | Information | [AdData:[GA_GoogleAdSlot: pubid=ca-pub1, name=TOPSLOT, loaded=0, tries=0]] |
| 0 | Information | Issuing fetch ad attr call with ./slotdata.js?client=ca-pub1 |
| 63 | Information | Attributes received for slots [TOPSLOT: width=336, height=280, expandable=false, enabled=true] |
| 63 | Information | Using Multiple Call, Asynchronous Implementation |
| 63 | Information | [AdData:[GA_GoogleAdSlot: pubid=ca-pub1, name=TOPSLOT, loaded=0, tries=0]] |
| 126 | Information | FetchAd Generated a correlator=1154379372491 |
| 141 | Error | Skipping undefined Ad Slot ("TOP2SLOT") |

FIG. 4

Google Debug Window

[Submit Data]

| Offset (msec) | Level | Message |
|---|---|---|
| 0 | Information | google_ads.js is being loaded at Monday, July 31, 2006 1:57:16 PM |
| 0 | Information | publisher URL=http://www.corp.google.com/~stsun/ads2/noslot.html?google_debug |
| 0 | Information | user agent=Mozilla/5.0 (Windows; U; Windows NT 5.1; en-US; rv:1.8.0.5) Gecko/20060719 Firefox/1.5.0.5 |
| 0 | Information | Google_ads.js finished loading |
| 0 | Information | [AdData:] |
| 0 | Information | Issuing fetch ad attr call with ./slotdata.js?client=ca-pub1 |
| 78 | Information | Attributes received for slots |
| 78 | Information | Using Multiple Call, Asynchronous Implementation |
| 78 | Warning | No slots defined on page |
| 78 | Error | This slot has not been defined: TOPSLOT |

FIG. 5

Google Debug Window ( Submit Data )

| Offset (msec) | Level | Message |
|---|---|---|
| 0 | Information | google_ads.js is being loaded at Monday, July 31, 2006 1:58:51 PM |
| 0 | Information | publisher URL=http://www.corp.google.com/~stsun/ads2/slot_error.html?google_debug |
| 0 | Information | user agent=Mozilla/5.0 (Windows; U; Windows NT 5.1; en-US; rv:1.8.0.5) Gecko/20060719 Firefox/1.5.0.5 |
| 0 | Information | google_ads.js finished loading |
| 0 | Error | publisher_id cannot be null or empty |
| 0 | Error | publisher_id cannot be null or empty |
| 0 | Error | slot name cannot be null or empty for publisher ca-pub1 |
| 0 | Error | slot name cannot be null or empty for publisher ca-pub1 |
| 15 | Information | Slot: publisher id=ca-pub1, name=TOPSLOT has been added |
| 15 | Error | Slot TOPSLOT has already been defined |
| 15 | Information | [AdData[GA_GoogleAdSlot: pubid=ca-pub1, name=TOPSLOT, loaded=0, tries=0]] |
| 15 | Information | Issuing fetch ad attr call with ./slotdata.js?client=ca-pub1 |
| 62 | Information | Attributes received for slots [TOPSLOT: width=336, height=280, expandable=false, enabled=true] |
| 62 | Information | Using Multiple Call, Asynchronous Implementation |
| 62 | Information | [AdData:[GA_GoogleAdSlot: pubid=ca-pub1, name=TOPSLOT, loaded=0, tries=0]] |
| 78 | Information | FetchAd generated a correlator=1154379531347 |
| 78 | Information | Generated iframe for slot TOPSLOT with <div id=google_ads_div_TOPSLOT><iframe id=google_ads_iframe_TOPSLOT width="336" height="280" vspace="0" hspace="0" src="./data.js?&client=ca-pub1&slotname=TOPSLOT&ref=http%3A%2F%2Fwww.corp.google.com%2F~stsun%2Fads2%2F&url=http%3A%2F%2Fwww.corp.google.co |

DIAGNOSTICS AND ERROR REPORTING FOR COMMON TAGGING ISSUES

CROSS-REFERENCE TO RELATED APPLICATIONS

This application is a continuation application of U.S. application Ser. No. 11/554,397, titled "Diagnostics and Error Reporting For Common Tagging Issues," filed on Oct. 30, 2006, the disclosure of which is incorporated herein by reference.

FIELD

This disclosure relates to content requests over a network.

BACKGROUND

Content displayed on web pages can be generated by one or more content servers in response to content requests. Publishers can embed content-server specific tags in web pages in order to serve content (e.g., ads) to their visitors from the content servers. Tags are used to describe what content slots exist in a given web page and what creatives can be served to each slot. Content may not appear in a given web page at the time for rendering due to network latencies, typographical errors in the tag names, and mis-configurations. For example, the tags may be incorrectly or incompletely specified, or correctly specified tags may not match the server-side settings. In addition, content presentation may fail due to client browser or operating system problems, locale or language issues, transient networking issues and the like.

When errors occur, a publisher typically will make a service call, which are time consuming and expensive to the content server provider. In many instances, the content server provider may have difficulty reproducing the underlying problem that causes an error. For example, the cause of the problem may be an older browser or non-supported version of an operating system. Transient network problems are also difficult to reproduce, which makes it difficult for the content server provider to diagnose the problem.

SUMMARY

Disclosed herein are systems and methods relating to the debugging of content requests. According to some implementations, a document at a location is requested that contains a script, where, the request includes an indicator. The requested document is received and the script is executed to test the status of a condition. The status is displayed in a window. The status can be indicated by color-coding in the window.

According to some implementations a system includes a content server configurable to receive content, a publisher server operatively coupled to the content server and configurable to determine a context from the content, and a content repository operatively coupled to the content server and configurable for providing the content server with content associated with a context. The publisher server provides computer executable instructions to a client device upon receiving a request from the client device. The computer executable instructions are executed by the client device to determine conditions related to the communication of content from the content repository to the client device.

According to some implementations a system includes a processor configurable to request content from a remote location and an interface operatively coupled to the processor and configurable to display debugging information. The content includes computer executable instructions to determine the debugging information associated with the request, and the debugging information can includes errors associated with the display of the content in the interface.

These and other example implementations can include one or more of the following features or advantages. In some implementations, the debugging information is provided in a user interface that allows the publisher to diagnose a problem and provide an effective report to the content server provider.

BRIEF DESCRIPTION OF THE DRAWINGS

FIGS. 4-6 are example interfaces for displaying debugging errors.

DETAILED DESCRIPTION

Figure 1:
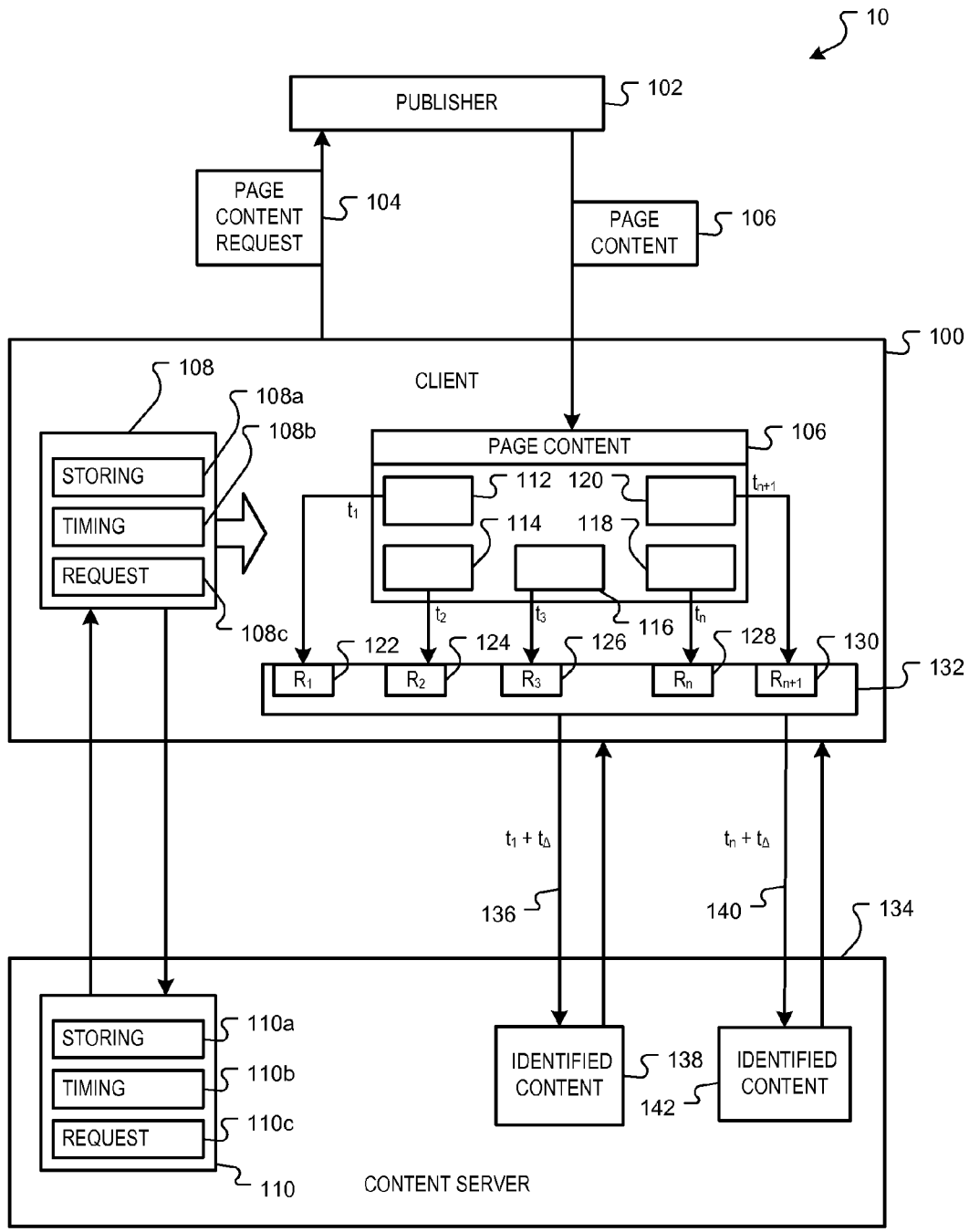
FIG. 1 is a block diagram of a system for requesting content from a content server.

FIG. 1 is a block diagram of a system 10 for requesting content from a content server. In one implementation, the content may include advertisements ("ads"), and the content server can be an ad server. Different types of content can also be requested, e.g., weather, driving directions, trivia, etc.

In one implementation, a client system 100 is configured to visit web pages over a network, e.g., the Internet. The client system 100 can, for example, be a web browser, or a computing device executing network navigation software, etc. The web address (e.g., Uniform Resource Locator (URL)) visited by the client system 100 can be resolved to identify a publisher 102, e.g. a server, hosting the corresponding web page. The client system 100 thus sends a web page content request 104 to the publisher 102 for the web page content 106. The publisher 102, in response to the request, provides the web page content 106 to the client system 100 as, e.g., an HTML document containing JavaScript. The web page content 106 can include one or more content presentations. In an implementation, the content presentations can include advertisement slots for advertisements to be served by an ad server. Other content presentations can also be used.

The web page content 106 provided by the publisher 102 includes a reference to a set of instructions 108. In an implementation, the instructions 108 include storing instructions 108a, timing instructions 108b and request instructions 108c that are used to render and present the requested content, e.g., advertisements. In an implementation, the instructions 108 are provided by a content server 134, e.g., and ad server, and are stored at the client system 100, such as in a cache associated with a web browser. In an implementation, the client system 100 can determine for each subsequent access to the stored instructions 108 whether the stored instructions 108 are the most recent version. If the stored instructions 108 are not the most recent version, the client system 100 can request the most recent version of instructions 110, which can include storing instructions 110a, timing instructions 110b and request instructions 110c from the content server 134. Upon receiving the most recent version of the instructions 110, the client system 100 stores the most recent version of the instructions 110 as the stored instructions 108.

The web page content 106 can define content slots 112-120 that are configured to display content from the content server 134. Though reference is made to a single content server 134, plural content servers can provide content to a single web page. In an implementation, the content slots 112-120 are ad slots that are defined within HTML tags. The instructions 108 generate content requests 122-130 that are issued to request content to fill the content slots 112 to 120. In an implementation, the requests 122 to 130 are stored in a data store 132, such as a buffer 132, and then sent to the content server 134 in one or more requests 136 and 140. The content server 134 processes the received individual or combined requests 136 and returns identified content 138 to the client system 100. The identified content 138 is then displayed as part of the publisher's web page in the corresponding content slots, e.g., content slots 112, 114 and 116.

When the client 100 requests content from the publisher 102, errors may be encountered because of mistakes in the tagging of the pages or in other environmental and operational conditions. Such errors include syntax errors, semantic errors, operational errors and environmental errors. Syntax errors are encountered when a web page violates rules for associated with a given protocol, e.g., HTML syntax or JavaScript syntax. Many HTML editors will detect syntax errors. Some common syntax errors include mismatched HTML tags, for example a closing tag is missing, which would prevent the page content from displaying correctly. Incorrect JavaScript syntax, such as a missing quote in a JavaScript function call, is another example.

Semantic errors can also be protocol based. For example, semantic errors can occur when JavaScript function calls are missing or occur in the incorrect sequence. Semantic errors can arise when an invalid or incorrect parameter value name is specified in a protocol (e.g., JavaScript) function calls. Examples include, an incorrect slot name, out-of-sequence JavaScript tags, and a page that attempts to fill a slot that has not been added.

Operational errors occur when content is not displayed as expected because of a discrepancy between tags in the web page content 106 and the information stored on the content server 134. Common operational errors include latency issues within the content server 134 where changed values have not fully propagated through the content server 134, disabled slots in the web page content 106, and particular content not appearing due to frequency capping, day-parting, date or budget issues.

Environmental errors occur when web page content 106 is successfully retrieved, but the client system 100 (e.g., web browser) fails to display the web content 106. For example, the client system 100 may not have JavaScript enabled or the client system 100 may not be supported.

The above errors are provided for exemplary purposes, as many types of errors can occur during the processes of defining, requesting, serving and displaying of web page content 106.

Figure 2:
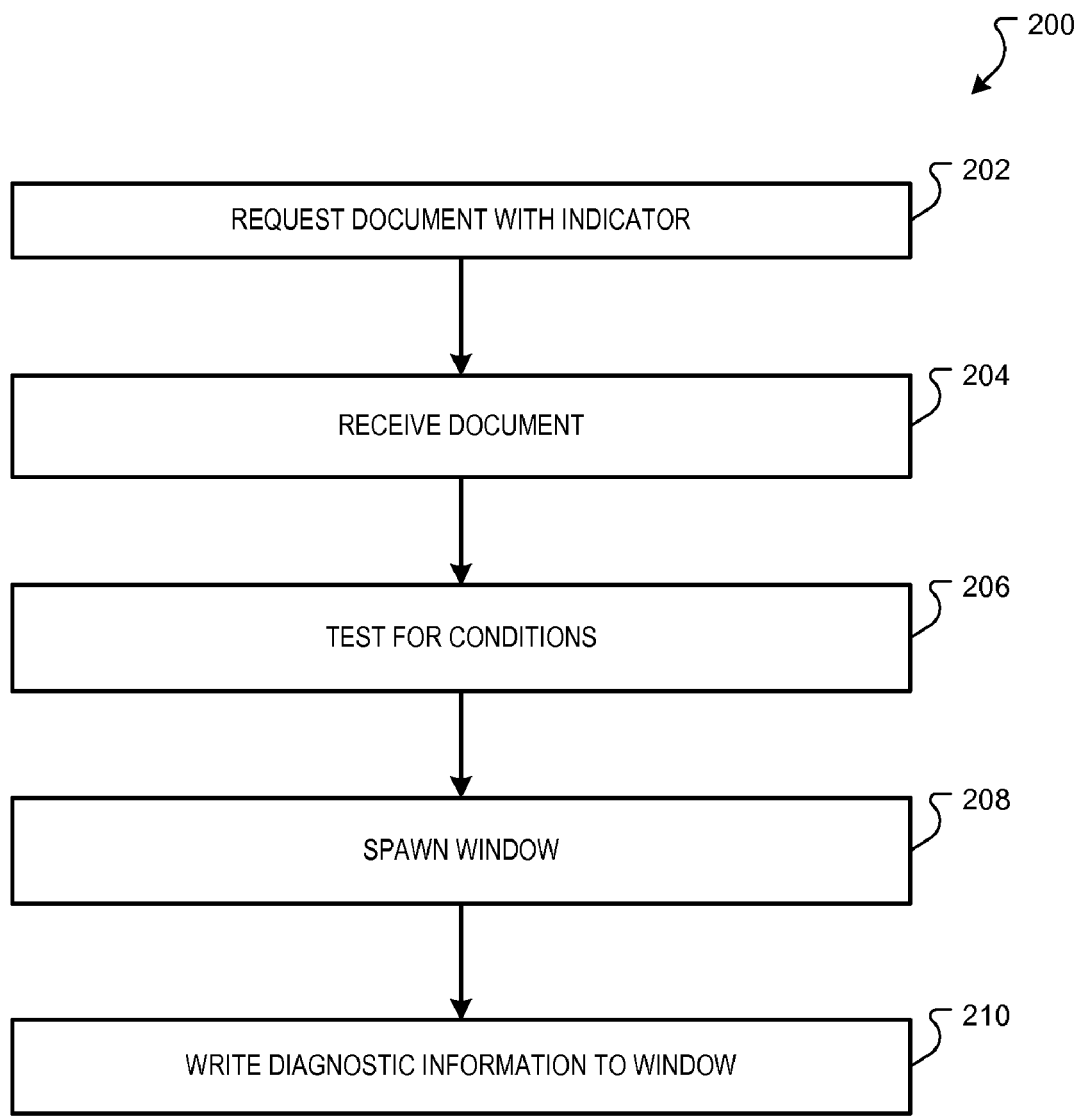
FIG. 2 is an example process for debugging a request for content from the content server.

With reference to FIG. 2, should one of the above exemplary errors occur, in accordance with some implementations, an example process 200 to provide debugging information begins with a request for a document or content from a web site where errors are encountered is made by including a flag (or other indicator) with the request (step 202). For example, a flag "google_debug" can be added to the URL of a web page content location as follows: http://www.website-with-errors.com/index.htm?google_debug.

Next, the requested document is received (step 204), and various conditions are tested to diagnose the cause of the errors (step 206). In some implementations, the content serving (e.g., JavaScript) tags within the web page content 106 implement diagnostic logic. For example, a script file within the web page content 106 can test for various conditions, and upon the existence or absence of such conditions, write information to a debugging user interface. The scrip file diagnostic logic tests to determine error related to, but not limited to: an identifier of the publisher 102, an order in which the web page content is served, if a slot is defined or disabled, if a slot was previously defined, attributes of slots, if a requested URL is too long, if an iFrame should be created for a slot (i.e., a frame inserted within a Web page which is not bound to the side of a browser window), if an HTML DIV element should be created for a slot, and if content for a slot has been received.

In some implementations, the content serving (e.g., JavaScript) tags within the web page content 106 implement tracing logic. Such tracing logic can capture server-bound URLs and responses from the content server 134 which are displayed in the debugging user interface. Displaying missing parameters in the URL or escaping issues in the responses aids in debugging errors. In some implementations, other information such as the UserAgent is captured and displayed.

In some implementations, a timer is started as each URL or request is communicated the content server 134 or publisher 102, which times-out when a response is received by the client 100. The timing information can be used to determine where environmental and operational delays are encountered.

After the conditions are tested, a debugging user interface is spawned (step 208) and information regarding the results of the testing are written to the debugging user interface (step 210). In some implementations, the debugging user interface is created by JavaScript code that provides a separate browser window. A JavaScript class provides methods such as writeInfo, writeWarning, writeError to write various types of information to the debugging window. The methods also display timing information to show the length of time consumed by a particular operation, and color-code errors and unusual circumstances to identify problems.

Figure 3:
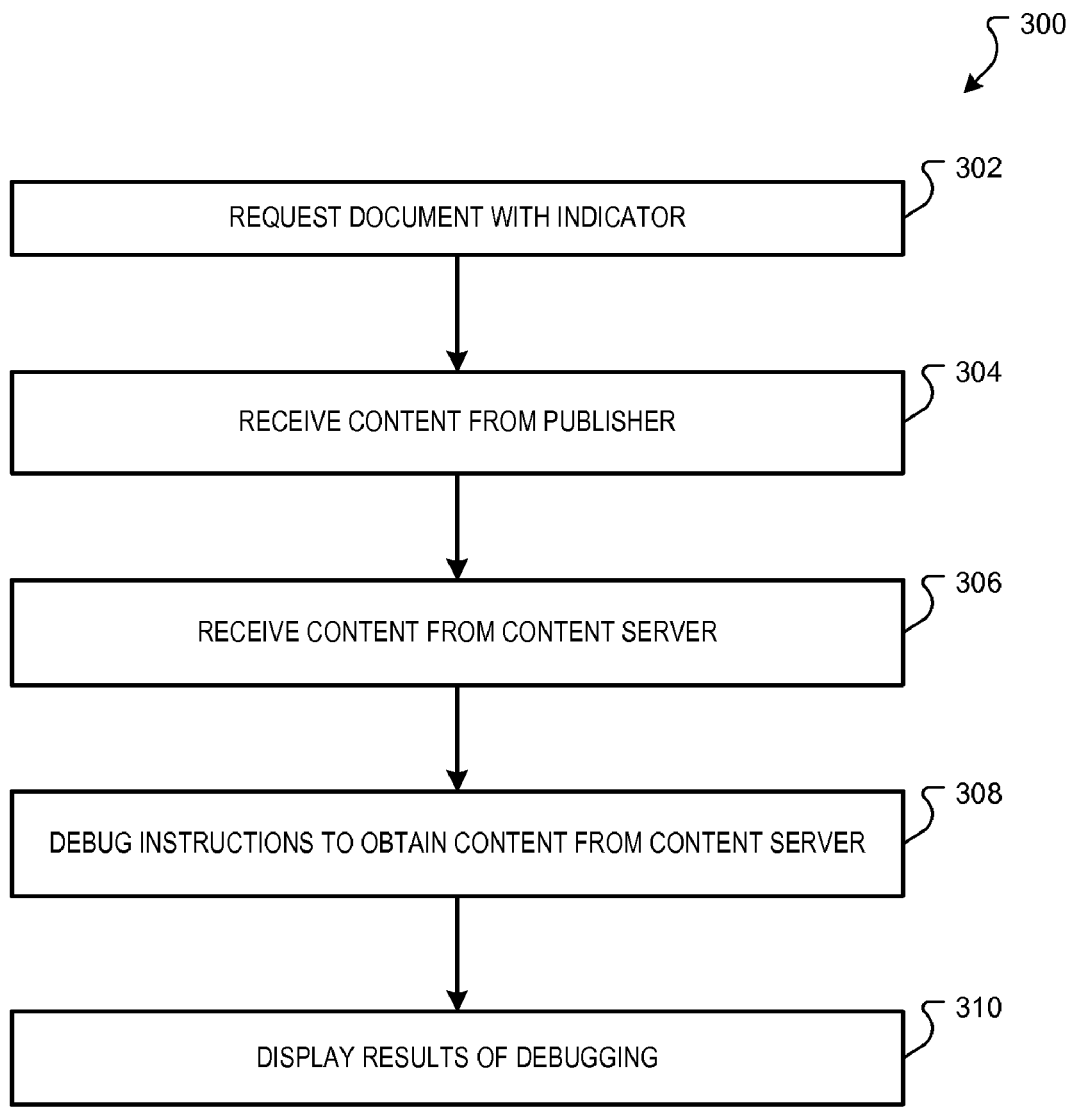
FIG. 3 is another example process for debugging a request for content from the content server.

FIG. 3 is a flow chart of another exemplary process 300 to debug errors in retrieving content from the content server 134. A document or content 106 from the publisher 102 is requested, where the request include an indicator (step 302). The document or content 106 is received by the client 100 (step 304). Content from the content server is then received (step 306). In some implementations, the content 106 received from the publisher 102 includes a script having instructions that requests content from the content server 134 and provides that content to the client 100.

Next, the instructions to obtain content from the content server are debugged (step 308). In some implementations, the content serving (e.g., JavaScript) tags within the web page content 106 implement diagnostic and/or tracing logic, as described above with regard to FIG. 2. The results of the debugging are displayed (step 310). In some implementations, the debugging user interface is created by JavaScript code that provides a separate browser window, within which information is written, as noted above.

Below is an example portion of HTML code that requests content (e.g., ads) from the content server 134 and displays the web page content 106. In the example below, one slot is requested from the content server 134, and additional slots can be requested.

```
<html xmlns="http://www.w3.org/1999/xhtml" lang="en" xml:lang="en">
<head>
    <!-- download Google Ads JavaScript -->
    <script language="JavaScript" src="./google_service.js">
    </script>
    <script language="JavaScript">
        GS_googleAddAdSenseService("ca-pub1");
        GS_googleEnableAllServices( );
```

-continued

```
        </script>
        <!-- JavaScript for slot TOPSLOT -->
        <script language="JavaScript">
            GA_googleAddSlot("ca-pub1", "TOPSLOT");
        </script>
        <!-- JavaScript for retrieving ads -->
        <script language="JavaScript">
            GA_googleFetchAds( );
        </script>
    </head>
    <body onload="">
        <!-- create iframe for TOPSLOT -->
        <script language="JavaScript">
            GA_googleFillSlot("TOP2SLOT");
        </script>
        <div id="content">
        <p> Sample page content.
        </p>
        </div>
    </body>
</html>
```

In the example, a script file (google_service.js) is designated in the header for serving content (e.g., slots 112-120) that is displayed as part of the web page content 106. The publisher has added a particular slot "TOPSLOT;" however, the publisher has indicated that a slot "TOP2SLOT" is to be filled. The slot TOP2SLOT does not exist either because it is misspelled or missing. When the client system 100 executes the script, the diagnostic logic generates warnings using the writeError( )method or errors using the writeError ( ) method based on this mismatch. An example of this is shown in FIG. 4, where the debugging user interface 400 created by the diagnostic logic indicates that the slot has not been defined.

FIG. 5 illustrates another example debugging user interface 500 where the publisher has not defined any slots and the script generates a warning. When the publisher attempts to render TOPSLOT, an error message is generated in the debugging user interface 500.

FIG. 6 illustrates a debugging user interface 600, showing other errors such as a missing publisher identifier, TOPSLOT has been defined, a missing slot name, duplicate definitions of TOPSLOT, and other transactional information.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications, and variations to the examples without departing from the scope of the invention.

What is claimed is:

1. A computer-implemented method, comprising:
   requesting, at a client device, a document referencing a script and including instructions, the script implementing diagnostic logic, the instructions to obtain content from a content server, and the request including an indicator;
   receiving, at the client device and in response to a request from the client device, the document and the script;
   executing, at the client device, the instructions to obtain content from the content server; and
   executing, at the client device, and in response to the request including the indicator, the script to test status of conditions to determine errors related to the processing of the instructions to obtain content from the content server, wherein testing status of conditions comprises determining if an operational error occurs because of a discrepancy existing between information specified by the document and information stored on a content server.

2. The computer-implemented method of claim 1, wherein: the document is a web page; and
   further comprising:
   displaying the web page in a first browser window on the client device;
   generating, at the client device, a debugging user interface in a second browser window separate from the first browser window on the client device; and
   displaying in the debugging user interface results of the diagnostic tests.

3. The method of claim 2, further comprising:
   determining a status state of a result of a diagnostic test; and
   color-coding the result based the status state.

4. The method of claim 2, further comprising:
   displaying timing information in the second browser window to show a length of time required to complete an operation tested by a diagnostic test.

5. The method of claim 2, further comprising:
   displaying requests made to the content server in the second browser window; and
   display responses from the content server in the second browser window.

6. The method of claim 1, wherein the operational error comprises one of differences between tags specified in the document and information on the content server, latency issues caused by delays in the content server, or disabled slots in the document.

7. The method of claim 1, wherein testing status of conditions comprises testing if requested content is successfully received by the client device but not displayed.

8. The method of claim 1, wherein the request is a Uniform Resource Locator (URL) of the document and the indicator is a flag added to the URL.

9. A computer-implemented method, comprising:
   requesting, at a client device, a document referencing a script and including instructions, the script implementing diagnostic logic, the instructions to obtain content from a content server, and the request including an indicator;
   receiving, at the client device and in response to a request from the client device, the document and the script;
   executing, at the client device, the instructions to obtain content from the content server; and
   executing, at the client device, and in response to the request including the indicator, the script to test status of conditions to determine errors related to the processing of the instructions to obtain content from the content server, wherein testing status of conditions comprises testing if function calls specified in the document are missing or occur in an incorrect sequence.

10. A computer-implemented method, comprising:
    requesting, at a client device, a document referencing a script and including instructions, the script implementing diagnostic logic, the instructions to obtain content from a content server, and the request including an indicator;
    receiving, at the client device and in response to a request from the client device, the document and the script;
    executing, at the client device, the instructions to obtain content from the content server; and
    executing, at the client device, and in response to the request including the indicator, the script to test status of conditions to determine errors related to the processing of the instructions to obtain content from the content server, wherein testing status of conditions comprises determining if the document includes an incorrect slot name, or out-of-sequence JavaScript tags.

11. A non-transitory computer-readable medium having software instructions stored thereon, which, when executed by a client device, causes the client device to perform the operations comprising:
  requesting, at a client device, a document referencing a script and including instructions, the script implementing diagnostic logic, the instructions to obtain content from a content server, and the request including an indicator;
  receiving, at the client device and in response to a request from the client device, the document and the script;
  executing, at the client device, the instructions to obtain content from the content server; and
  executing, at the client device, and in response to the request including the indicator, the script to test status of conditions to determine errors related to the processing of the instructions to obtain content from the content server, wherein testing status of conditions comprises determining if an operational error occurs because of a discrepancy existing between information specified by the document and information stored on a content server.

12. The computer-readable medium of claim 11, wherein:
  the document is a web page that is displayed in a first browser window; and
  the script causes the client device to perform operations further comprising:
    generating, a debugging user interface in a second browser window separate from the first browser window on the client device; and
    displaying in the debugging user interface results of the diagnostic tests.

13. The computer-readable medium of claim 12, wherein script causes the client device to perform operations further comprising:
  determining a status state of a result of a diagnostic test; and
  color-coding the result based the status state.

14. The computer-readable medium of claim 12, wherein the script causes the client device to perform operations further comprising:
  displaying timing information in the second browser window to show a length of time required complete an operation tested by a diagnostic test.

15. The computer-readable medium of claim 12, wherein the script causes the client device to perform operations further comprising:
  displaying requests made to a content server in the second browser window; and
  display responses from the content server in the second browser window.

16. The computer-readable medium of claim 11, wherein the operational error comprises one of differences between tags specified in the document and information on the content server, latency issues caused by delays in the content server, or disabled slots in the document.

17. The computer-readable medium of claim 11, wherein testing status of conditions comprises testing if requested content is successfully received by the client device but not displayed.

18. A non-transitory computer-readable medium having software instructions stored thereon, which, when executed by a client device, causes the client device to perform the operations comprising:
  requesting, at a client device, a document referencing a script and including instructions, the script implementing diagnostic logic, the instructions to obtain content from a content server, and the request including an indicator;
  receiving, at the client device and in response to a request from the client device, the document and the script;
  executing, at the client device, the instructions to obtain content from the content server; and
  executing, at the client device, and in response to the request including the indicator, the script to test status of conditions to determine errors related to the processing of the instructions to obtain content from the content server, wherein testing status of conditions comprises testing if function calls specified in the document are missing or occur in an incorrect sequence.

19. A non-transitory computer-readable medium having software instructions stored thereon, which, when executed by a client device, causes the client device to perform the operations comprising:
  requesting, at a client device, a document referencing a script and including instructions, the script implementing diagnostic logic, the instructions to obtain content from a content server, and the request including an indicator;
  receiving, at the client device and in response to a request from the client device, the document and the script;
  executing, at the client device, the instructions to obtain content from the content server; and
  executing, at the client device, and in response to the request including the indicator, the script to test status of conditions to determine errors related to the processing of the instructions to obtain content from the content server, wherein testing status of conditions comprises determining if the document includes an incorrect slot name, or out-of-sequence JavaScript tags.

* * * * *